Aug. 16, 1932.　　　G. C. THOMAS, JR　　　1,872,048
THREADLESS PIPE COUPLER
Filed Oct. 11, 1927　　3 Sheets-Sheet 1

Inventor
GEORGE C. THOMAS JR.
By his Attorneys
Ohleber & Ledbetter Aug. 16, 1932.   G. C. THOMAS, JR   1,872,048
THREADLESS PIPE COUPLER
Filed Oct. 11, 1927   3 Sheets-Sheet 2

Inventor
GEORGE C. THOMAS JR.
By his Attorneys

Aug. 16, 1932.   G. C. THOMAS, JR   1,872,048
THREADLESS PIPE COUPLER
Filed Oct. 11, 1927   3 Sheets-Sheet 3

Inventor
GEORGE C. THOMAS Jr.
By his Attorneys

Patented Aug. 16, 1932

1,872,048

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

THREADLESS PIPE COUPLER

Application filed October 11, 1927. Serial No. 225,471.

This invention relates to couplers and more particularly to threadless pipe couplers used in connection with electrical conduit work or in plumbing and the like.

An object of the invention is to produce a coupler which joins pipes or conduits without the necessity of threading them, and to produce a coupler of few parts, more particularly two parts, and which does not necessarily require a third part such as a gland as used in other couplers to effect the anchorage function.

A further object is to produce a threadless coupler inexpensive to manufacture, which positively connects pipes, which is convenient to install, which characteristically draws the unthreaded smooth end pipe into the coupler member as the parts are tightened, and which effects a positive electrical ground connection between the pipe and coupler.

It is a further object to produce several forms of the threadless coupler by which the principles of the invention are fully disclosed, but it is to be understood that further modifications may be resorted to without departing from the scope of the invention.

The accompanying drawings illustrate several examples of the threadless coupler constituting the invention.

In its simplest construction in all the views, this two-part threadless pipe connecting device comprises a coupler member including a pipe receiving neck on which is movably carried an anchorage or gripping sleeve or means, the neck being provided with an off-set opening into which the pipe fits through the sleeve. The sleeve or means establishes a firm anchorage with the pipe and with the coupler neck and forces the pipe laterally against the internal wall of the coupler to fix all parts together. Novel features of construction are incorporated into the device by which movement of the single sleeve part firmly seats the pipe in the coupler member and effects anchorage of the pipe to the sleeve and hence anchors all parts together. The coupler member and anchorage sleeve may or may not include screw-threaded means as will be shown in connection with the several modified forms of the invention.

According to the principle of the invention as depicted in all the figures or views, I employ a coupler member with an off-set or eccentric opening to receive a pipe end which may or may not be threaded but which is often unthreaded and hence is smooth at the end. The off-set position or eccentricity of the pipe opening in the couple maintains the pipe eccentric to an anchorage sleeve including a gripping edge which is carried concentric with a coupler member. In view of the fact that the sleeve is thus carried, it follows that rotation of the sleeve through a complete turn or turns will not alter the condition that it remains eccentric with the pipe so that the gripping edge of the sleeve bears or cuts into the eccentrically mounted pipe during the several turns of the sleeve. In this way, the coupler operating part is not limited to a one-half turn as in cam and other related devices.

Means for anchoring the pipe in the coupler member involves the use of a tilted member comprising either an anchorage sleeve carried on and as a part of the coupler or comprising the pipe itself to be connected. The tilted position of one member, either the sleeve or pipe, in the general combination introduces an angularity between the axes of different parts by which the pipe is permitted entry through the anchorage sleeve into the eccentric opening of the coupler which is one purpose of this angular relation. The angularity existing between certain of the parts is also provided to effect a gradual bearing or cutting action of the sleeve against and into the pipe, whereby the sleeve positively grips the pipe by friction or by threading itself into it as in the manner of a thread die, which is another purpose of the angular relation between parts.

I therefore produce a threadless coupler including, among other features, an eccentric pipe socket, opening or passage into which a smooth pipe end is received. An anchorage sleeve is eccentric to the pipe opening and engages the pipe and coupler member to connect them together, and what is of particular importance is the fact that I provide means, residing in a feature of angularity between parts, whereby the bearing or gripping threaded edge on the sleeve first lightly engages the pipe when the parts are first put together, but thereafter binds, scrapes, cuts, or threads itself deeply into the pipe when the sleeve is forced in final position.

The first form of the construction is shown in Figures 1 through 4, wherein the coupler member is provided with a pipe end receiving hole or opening of suitable size and which is offset or eccentric and which more particularly is slightly larger than the pipe so as to permit a limited lateral movement of the pipe within the coupler opening and by which said pipe may be tilted to a slight angle in relation to the axes of certain parts in the combination. In this instance the axis of the pipe is tilted at an angle to the axis of the coupler member so as to permit entry of the pipe through the anchorage sleeve and to permit an easy starting action of the sleeve. Since the pipe opening in this first form of the coupler is larger than the pipe received thereinto, said opening may be straight, i. e., its axis is parallel with the axis of the coupler member, and the looseness of the pipe in the coupler hole affords room by which the pipe may be tilted to attain an angular position for the purposes mentioned.

A second form of the invention is shown in Figures 5 through 7, wherein the coupler member is made with an off-set or eccentric pipe opening, said opening being restricted in size to form a snug fit with a pipe, and said opening being disposed at a slight angle to the longitudinal axis of the coupler member. This form is similar to the first form already briefly described. The only material difference between the two forms being the loose pipe opening which is straight in the first form, and a snug fit pipe opening which is at an angle in this second form.

A third form of the invention, sometimes called the loose-thread form, is shown in Figures 8 through 11, wherein a pipe fits snugly and straight into an off-set hole in the coupler member, and a loosely threaded sleeve is designed to anchor all parts together. This characteristic loose thread form of coupler provides a wobbly threaded sleeve fit which allows the sleeve to hang at a slight angle in relation to the pipe to facilitate entry of the pipe and facilitate starting of the sleeve tightening operation, the threads being sufficiently loose to allow the sleeve to droop or hang of its own weight at its outer free end to attain the necessary angularity when its first few threads are started onto those of the coupler member.

Figures 10 and 11 are enlarged fragmentary lengthwise sections of the loose thread form of coupler.

A fourth form of the construction, which may be called the non-threaded coupler, is shown in Figures 12 through 14 wherein the coupler is provided with an off-set straight pipe opening together with the feature of angularity as in the other forms, said angularity existing, however, in the anchorage sleeve similar to the third form. Anchorage means comprising a sleeve, and ordinarily itself threaded, is not here provided with screw threads. This form therefore constitutes a coupler in which threads are not even employed on the coupler member and sleeve. Its principle is similar to that of all other forms and particularly to that of the loose thread (third) form of the invention since the anchorage sleeve is here loose on the coupler member to permit entry of the pipe and allow easy starting of the sleeve.

It is now apparent that, throughout the views and forms briefly described, there is combined in various ways the eccentric and angularity features by which pipes are anchored to a coupler and hence to each other, and that the coupler, designed as it is for joining unthreaded pipes, may or may not itself be threaded.

Reference is now made to the drawings for a more detailed description of the several forms of the invention and the first form as shown in Figures 1 through 4 will now be described. Certain features of construction, such as that of angularity between the axes of different parts in the combination, are magnified in the drawings to fully disclose the same. When the pipe is disposed at an angle, as is true in the first and second forms, the existing angle is slight, and in service the pipe bends back to straight position.

A coupler member 16 of any suitable shape for various uses is made with necks 17 externally threaded at 19. Each neck is provided with an unthreaded passage, opening or pipe socket 18. The pipe hole or opening 18, in this first form of construction, is made slightly larger than the end of the pipe P received thereinto. In this way the pipe fits loosely in the coupler opening 18 and the axis of pipe P and neck 17 may be displaced or tilted at an angle one to the other to attain a slight degree of angular relation between these two parts. The pipe opening 18 is made off-set or eccentric to the outer threaded surface 19 of the neck 17 which, as will appear, is to always hold the pipe eccentric to an anchorage sleeve carried concentric on the coupler. The pipe therefore rests in the coupler sleeve in both an angular and eccentric relation to the axis of the coupler threads 19.

An anchorage means is employed to positively seat and hold the pipe P within each neck 17, and to this end a knurled gripping or anchorage sleeve 21 is internally threaded at 22 to screw upon the coupler threads 19. The sleeve 21 carries a flange 23 provided with a cutting or gripping edge in the form of threads 24 on its outer end. The opening defined by the die-like threads cutting or gripping edge 24 is slightly larger than the external diameter of the pipe intended to be anchored to the coupler 16, and this relation permits the pipe to be easily introduced through the flange 23 at a slight angle to the sleeve axis before the latter is tightened up. The sleeve threads 22 and 24 are concentric to the neck threads 19 and hence eccentric to the pipe opening 18, but in view of the fact that the pipe is projected into the coupler at an angle, the pipe clears the sleeve threads 24 and they do not therefore interfere with the assembling operation.

The sleeve 21 has its threads 22 first loosely engaged or just started on the threads 19 of the coupler neck 17 with the result that an arc portion of the cutting thread 24, which is eccentric to the opening 18, will first lightly engage the smooth surface of the pipe without scraping or cutting thereinto. This arrangement permits the pipe to be introduced through the sleeve end 23 and hence into the coupler opening 18, for, although the die-like sleeve opening 24 is eccentric to the coupler opening 18, and hence would stand in the way of inserting the pipe, nevertheless by making this opening 24 larger than the pipe, the latter is readily inserted through the sleeve and seated against a shoulder 25 in the coupler member. This condition exists because the pipe may be tilted at a slight angle in order to work it through the sleeve 21 and into the coupler over the eccentric edge 24 when the sleeve stands out on the end of the neck in loose position.

The pipe hole 18 being slightly larger than the pipe permits the pipe to fit into the straight hole and be tilted in an angular relation thereto, and the looseness makes for rapid assembly because the pipe finds a quick entry into the coupler. This same principle is carried out in the second form of construction shown in Figures 5 through 7, except there the pipe opening in the coupler provides a snug fit with the pipe as well as an angular relation to the axis of the anchorage sleeve.

It is now seen that the pipe P rests in the neck 17 at a slight angle to the anchorage sleeve 21, and that the sleeve has its first few threads loosely attached to the first few threads 19 of the coupler member, the result of which is to cause partial contact and light engagement between the threads 24 and the surface of the pipe. As the sleeve 21 is rotated to advance or screw it along the neck 17 toward the coupler head 16, it follows that its threads 24 begin to approach the pipe and with increasing depth cut and embed themselves thereinto. This action is due to the fact that the threads 24 gradually approach the tilted pipe surface as the sleeve 21 is moved along the neck. The result of screwing the sleeve 21 forwardly on the neck is to cause the die-like threads 24 to cut and actually thread themselves into the pipe thereby positively anchoring the sleeve to the pipe and the latter in the coupler, and also forcing the pipe laterally with great pressure against the internal wall of the opening.

It is noteworthy that a positive electrical connection is established between the pipe and coupler member 16—17. This is effected by the sharply cut gripping edge 24, which embeds itself into the pipe surface and particularly by scraping along the pipe to remove the rust or enamel therefrom and thus cut into the new metal beneath the surface of pipe by which positive metallic contact is made between the parts. This construction provides good electrical contact between the pipe and coupler due to the fact that the engaging screw-threads 19—22 causes the sleeve 21 to advance lengthwise along the neck 17 at a faster rate than would alone be initiated by the pitch or lead of the finer threads 24 working into the pipe. The action of the threads 19—22 controls and enforces the movement of the sleeve 21 along the neck 17 because the engagement of threads 24 with the pipe is never more than half way around the pipe, and it follows that the threads 24 are caused to scrape along the pipe surface and thus drag the pipe into the opening 18 and positively seat the end thereof against the shoulder 25.

Figures 1, 2, 3:
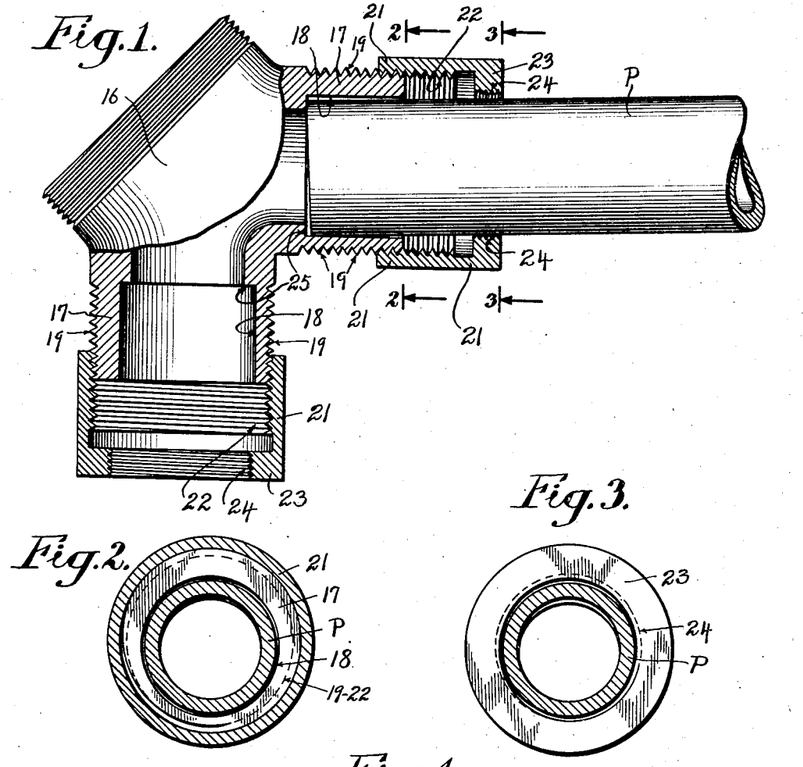
Figure 1 shows the coupler member made in the form of an elbow with a smooth end conduit placed therein and with the anchorage sleeve in its position assumed before the pipe is finally anchored. This view shows the head of the elbow in partial elevation while its pipe connecting necks are shown in longitudinal section.
Figures 2 and 3 show cross sections taken, respectively, on lines 2—2 and 3—3 of Figure 1 and showing the parts in loose position before being tightened.
Figure 4:
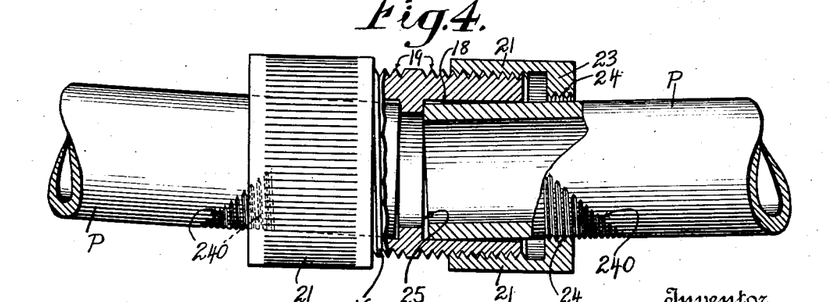
Figure 4 shows two conduits attached to a straight form of coupler, the anchorage means comprising a threaded sleeve which is tightened to finally anchored position to grip the pipes and anchor them to the coupler.

Figure 1 shows the position of the parts before the sleeve 21 is screwed up and it will be observed that the threads 24 have not yet cut themselves into the pipe. However, Figure 4 shows the position of the parts after the anchorage sleeve is tightened, and it is observed that the threads 24 have cut themselves into the pipe to form the threads 240 therein, the threads 24 acting, in effect, as a die which cuts the threads 240. The pipe threads 240 extend only part way around the pipe P, and after the sleeve 21 is completely tightened, the innermost or last threads 240 are found to be cut substantially 180° about the pipe which establishes a positive anchorage on the pipe by the sleeve. Since the pipe is eccentric to the coupler, and the anchorage sleeve is concentric to the coupler, there is no limitation on the rotating engagement of the sleeve gripping end 24 with the pipe, that is to say, engagement is effected during all the period of the full turn of the sleeve so that the sleeve operation is not limited to a 180° movement as in cam-like devices.

The difference between the pitch of the engaged threads 19—22 and the die threads 24 establishes a thread differential which I make use of in the particulars disclosed. In the first place, the die threads 24 are dragged by the advancing sleeve across the pipe to cut away its surface to make good electrical contact. In the second place, this dragging action forces or draws the pipe into the coupler member.

The sleeve open threaded end 24 is larger than the diameter of the pipe, and in view thereof the pipe can easily be inserted by manipulating it at an angle over the sleeve gripping threads 24 and into the coupler. In the several modifications, the outer sleeve end is similarly larger than the pipe to be coupled, this feature being employed to admit a condition of angularity to obtain in certain parts of the combination.

Figure 5:
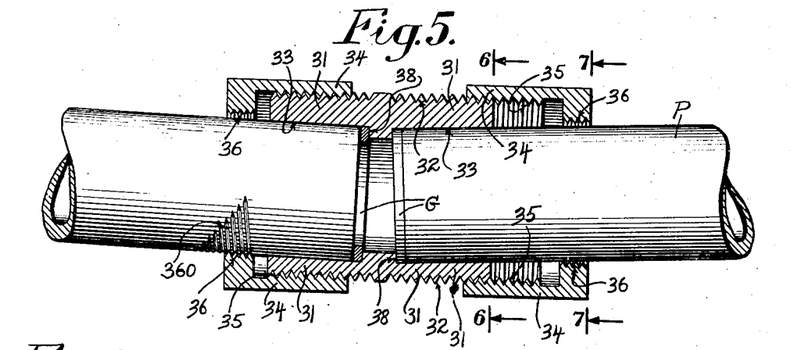
Figure 5 shows the coupler with the pipe in finally anchored position at the left hand end, while the pipe at the right hand end is loose within the coupler and loose within the anchorage sleeve and is yet to be tightened up to rigidly fix the threadless pipe to the threadless coupler.
Figure 6:
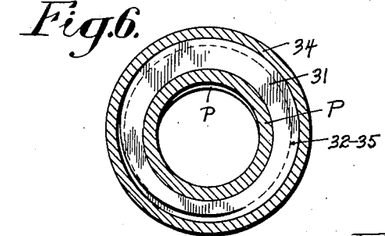
Figures 6 and 7 are views, respectively, on the lines 6—6 and 7—7 of Figure 5 showing the pipe loose.
Figure 7:
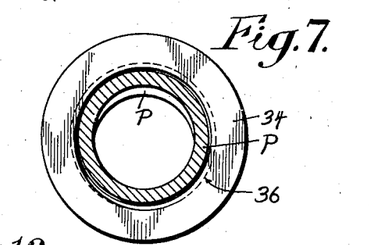
Figure 8:
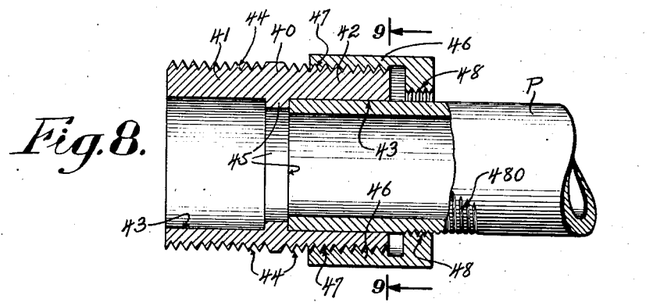
Figure 8 shows a longitudinal view of the loose thread coupler with the pipe anchored therein by the loosely threaded sleeve, the sleeve axis being parallel to the coupler axis because the initial angularity of the sleeve disappeared as it was screwed into final position.

Coming now to a description of the second form of the invention shown in Figures 5 through 7, there is shown a threadless pipe coupler member including necks 31 externally screw threaded at 32. Each neck is made with a pipe receiving opening 33 which is formed eccentric to the outer threaded surface 32, this eccentricity being provided for the purpose as already described in connection with the first form of the invention, namely, to hold the pipe in engagement with an anchorage sleeve as it rotates to effect joiner of all parts. The opening 33 is formed at a slight angle to the longitudinal axis of the coupler member 31 so that the pipes are held in the coupler at a slight angle thereto for purposes similar to those heretofore described, namely, to facilitate entry of the pipe and allow gradual attack of an anchorage thread on the pipe. This angularity is very slight and the pipes bend back to straight position in all forms of the invention after installation.

An anchorage sleeve 34 is internally screw threaded at 35 to engage the threads 32 on the coupler 31. This sleeve also carries a cutting or gripping edge or threaded opening 36 which lightly engages the pipe P which passes at an angle through the sleeve. As the sleeve 34 is rotated on the neck 31 and advances towards the center of the coupler member, it follows that the screw threads 36 cut into the pipe surface in the manner of a thread die with increasing depth and thereby positively join the pipe to the coupler. By moving or screwing the knurled sleeve 34 all the way up, it follows that substantially deep threads 360 are cut into the pipe by the die threads 36 so that a positive electrical ground connection is made between the coupler member 30 and the pipe. Furthermore, the drag of the threads 36 causes the pipe to seat its inner end with considerable pressure against a gasket G disposed at the bottom of the pipe opening 33 and resting against the shoulder 38. The gasket G may or may not be used, depending somewhat on the particular work at hand.

It is to be noted that the face of the shoulder 38 may to advantage be disposed at an angle to the axis of the coupler necks 31 so as to be perpendicular to the axis of the pipe opening 33. In this way the straight or square end of the pipe makes good contact with the shoulder, and particularly with the gasket when it is used.

The third form of the invention shown in Figures 8 through 11 will now be described and may be referred to as the loose-thread type and is simple to manufacture. There is shown a coupler member 40 with necks 41 and 42 provided with pipe opening hole 43 in each neck, the pipe holes being eccentric to the axis of the external threads 44, as described in connection with other forms of construction. The pipe opening 43 extends through the coupler member but in reality is separated into the two pipe openings 43 by a central shoulder 45 against which a pipe is seated, or a gasket may be set into the coupler against which the pipe end is seated.

These pipe openings 43 are preferably of restricted size so as to form a close fit with the pipe, and the sockets are formed straight, i. e., no angle is necessary between the axis of the socket and that of the coupler necks. The pipe therefore extends straight into the coupler. The pipe is placed straight into the coupler and fits snugly which is to say that no clearance is left by which to afford an angular position of the pipe within the coupler, although angularity of one part, an anchorage sleeve, is provided as will now be explained.

Figures 9, 10, 11:
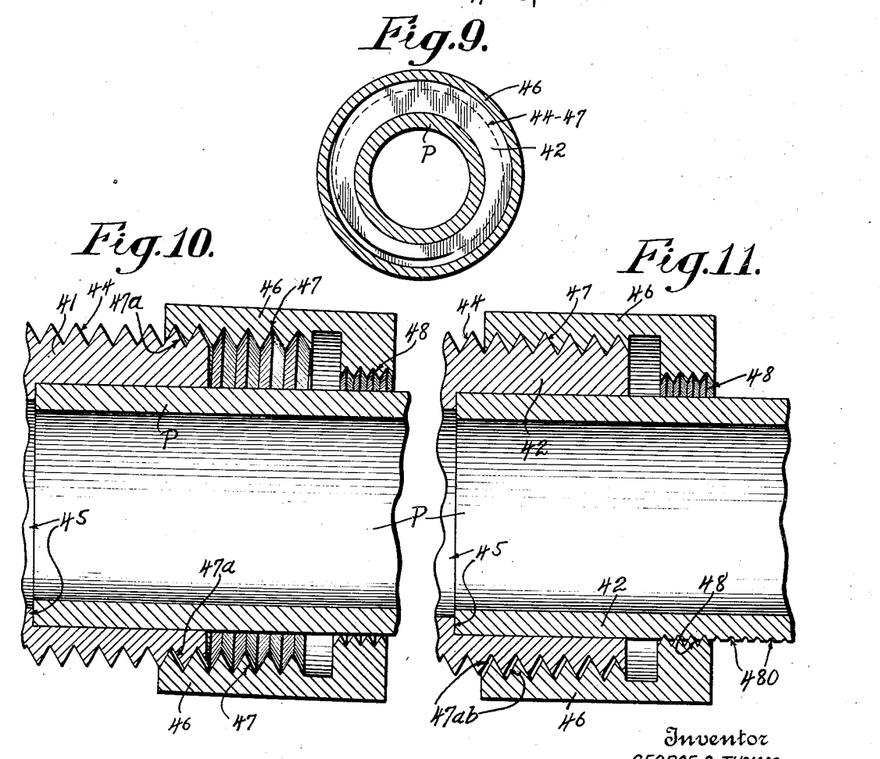
Figure 9 is a cross sectional view on the line 9—9 of Figure 8 and showing the parts tightened.
Figure 10 shows the parts before being tightened, with the anchorage sleeve hanging at a slight angle due to the loose threads.
Figure 11 shows the position of the parts after the sleeve is tightened to final position, the anchorage sleeve gradually reaching a straight position as it is screwed onto the coupler member.

An anchorage sleeve 46 is internally screw threaded at 47. The threads 47 are slightly larger in diameter than the coupler member threads 44, the result of which is to provide a loose or wobbly fit between the sleeve 46 and neck 42. In this way the sleeve 46, when its first threads engage the first threads 44 on the neck, occupies a loose movable relation with the member 40. This is caused by the threads 44—47 not having the standard measure of engagement, i. e., clearance exists in these threads. This construction permits the sleeve 46 to tilt downwardly of its own weight at its outer free end as shown in Figure 10 when the parts are first put together. The tilt is slight but sufficient for the purposes in question and to easily admit the pipe.

The sleeve 46 is provided with a threaded gripping aperture 48 at its outer end which embraces the pipe P and lightly engages it in the same way as heretofore explained. This pipe gripping aperture 48 is eccentric to the pipe openings 43 in the coupler which means that the threads 48 extend inwardly beyond the surface defining the opening 43 to cut into the surface of the pipe when the sleeve is tightened.

The loose fit between the threads 44 and 47 permits the pipe gripping end 48 of the sleeve to tilt downwardly under its own weight, as shown in Figure 10 where 47ª shows thread clearance and looseness, so that the pipe may be introduced through the sleeve. As the sleeve is tightened, the tilt or angular position thereof is gradually eliminated because it rapidly straightens up as it advances on the neck 42. This straightening up action or gradual diminishing of its angular position in relation to the axis of the pipe and coupler neck causes the threads 48 to gradually approach the pipe surface and cut threads 480 into it with increasing depth to anchor the pipe in the coupler.

The loose thread relation between the neck and the sleeve 42 is best shown in the enlarged views where the loosely retained sleeve in Figure 10 shows screw-thread clearance 47ª all around the sleeve. However, in Figure 11 the clearance has accumulated or seems to work around to one side only so that all the thread clearance is there shown as 47ab which places all the thread clearance on the same side with that arc portion of the gripping threads 48 which bites into the pipe because the resistance offered by the pipe to the action of the cutting threads scraping on the pipe surface causes the sleeve threads to fit closely on one side, the upper side in Figure 11, and move away from each other on the opposite side at 47ab.

The differential thread pitch between the threads 44—47 and die-like gripping threads 48 effects a drag on the pipe which thrusts it inwardly to seat its inner end against the shoulder 45. The cutting of threads 480 in the pipe by the gripping threads 48 is positive which makes good electrical contact and also makes a good pipe joiner with the coupler.

I have therefore produced a pipe coupler, in several forms, which includes, among other things, an anchorage sleeve having an opening larger than the pipe received therethrough, and this opening is made with die-like threads which engage a part only of the circumference of the pipe which it engages. While the die-like thread gripping opening runs or turns free of the pipe at the inception of the sleeve movement, the threads nevertheless rapidly attack and bite into the pipe because of the angular relation between the pipe and anchorage sleeve.

Figure 12:
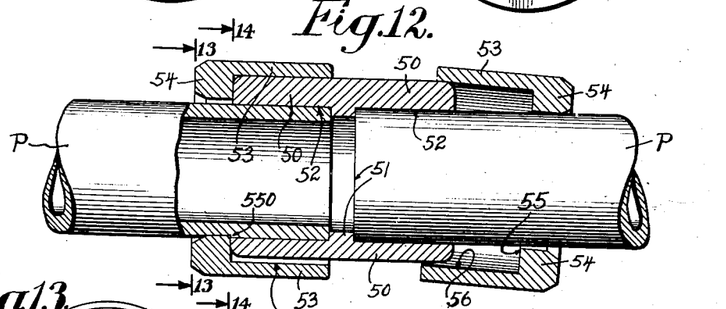
Figure 12 shows a longitudinal section of the fourth form of the coupler with one pipe in final anchored position. The other pipe is placed loosely therein with the anchorage sleeve in starting position.
Figure 13:
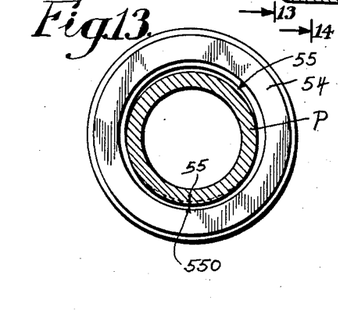
Figures 13 and 14 show cross sections taken, respectively, on lines 13—13 and 14—14 of Figure 12 and showing the parts in tightened position.
Figure 14:
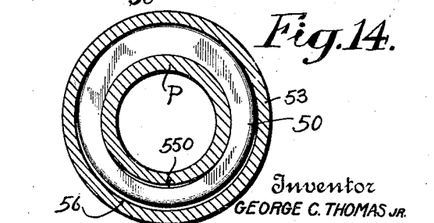

The last form of the invention shown in Figures 12 through 14 provides a coupler threadless in itself because it is totally devoid of all screw threads. Its anchorage sleeve acts by friction with the coupler to hold the pipe P in the coupler member. A coupler member including necks 50 may be made with a dividing shoulder 51 to define a pipe opening 52 formed eccentrically in each end of the coupler member 50. The pipe opening 52 is made a snug fit with the pipe, and the opening is made straight into the coupler.

A friction or anchorage sleeve 53 carries a reinforced driving or hammer head 54 including a frictional bearing surface, sharp cutting edge or corner 55 which bears or digs itself into the smooth surface of the pipe as the sleeve 53 is forcibly driven or moved along the coupler neck 50. The internal diameter 56 of sleeve 53 is larger than the coupler neck 50 to form a loose fit therewith and is in that respect similar to the third form or loose thread construction.

The sleeve opening defined by the gripping or cutting edge 55 is eccentric to the pipe opening 52 and it therefore requires a slight tilt of the sleeve, as shown in Figure 12, to readily permit introduction of the pipe through the sleeve into the coupler. After the pipe is in position, the sleeve 54 is hammered forwardly by driving on the reinforced head 54, the result of which is to cause the friction or cutting edge 55 to bind or embed itself against the surface of the pipe and drag it with great force into the coupler and seat the end of the pipe against the shoulder 51, where a gasket may or may not be used as desired.

The high degree of frictional engagement attained between the surfaces of the sleeve 53 and coupler 50, the binding or cutting of the gripping edge 55 into the pipe and the great lateral pressure exerted by the pipe against the inner wall of the coupler neck effect a positive joiner of the pipe and coupler as well as a positive electrical ground contact between all parts. The cutting edge 55 so efficiently embeds itself into the pipe, that a substantially deep shoulder is cut into the pipe, as indicated at 550, by which the pipe is held by the bite of the cutting edge 55. The sleeve 53 climbs upon the coupler neck 50 under pressure exerted at the outer end 54 of the sleeve, and the sleeve is preferably of malleable iron so that it may give or stretch under the strain to which it is subjected when forced from the coupler neck.

It is now appreciated that all forms of the invention include a pipe opening or passage eccentric to the outer surface of the coupler member, and also provide an angular position between certain of the parts, say the sleeve in some form and the pipe in others, to permit ready entry of the pipe and easy starting of the sleeve to anchor all parts together. The threaded die-like open ends 24, 36, 48, and the bearing or scraping surface 55 of the unthreaded anchorage sleeve, all have a similar function to perform, namely that of gripping the pipe and exerting great lateral pressure on the pipe to clamp it within the smooth opening of the coupler member.

In the operation and use of the device, the anchorage sleeves are in loose position standing out on the end of the necks as in Figures 1, 5, 12 and 10, and their open die-like or frictionally gripping ends lightly engage the pipe, but as the sleeve or sleeves are advanced, the respective gripping portions 24, 36, 55 and 48 quickly approach and gradually cut into the pipe. The depth of cut or bite taken into the pipe is measured by the degree of the angle which the pipe makes with coupler neck in the first and second forms of the invention, and is measured by the degree of the angle which the sleeve makes with the pipe in the third and fourth forms of the invention.

In all the forms of the invention where the anchorage sleeve screw-threads onto the coupler, eccentricity of the pipe to the coupler member is provided so that the sleeve gripping edges function to cut into the pipe during the complete turns of the anchorage sleeve, and angularity is provided to enable the parts to be assembled and execute a gradually deepening gripping bite between the parts.

The fact that the die-like outer gripping ends of the anchorage sleeve, in all forms of the invention using threaded parts, are defined by a threaded aperture slightly larger than the pipe to be fixed in the coupler and which aperture is eccentric to said pipe, means that a portion somewhat less than 360° of the threaded circle is caused to thread into the pipe, and more particularly about 180°. The approach of the gripping threads to the pipe being gradual, and the contact of the gripping threads being less than a full circle, it follows that the gripping threads are not subjected to a breaking down test in performing their function. That is to say, the threads are not damaged in executing a deep cut into the pipe despite the fact that the threads may be formed in cast iron sleeves and therefore would seemingly not possess the requisite durability to cut into hard members. However, I have designed the device and general combination in such an efficient way that the gripping threads undergo minimum cutting requirements with consequent minimum wear, yet produce maximum lateral pressure on the pipe which is resisted by the coupler neck. In this way the two members, a pipe and coupler, are clamped together one in the other.

Figures 4 and 5 may be taken as a general illustration of the 180° thread cut executed by the die-like gripping end of the anchorage sleeve. There is shown the threads 240 cut into the pipe by the die-threads 24; and also the threads 360 cut into the pipe by the die-threads 36. In both cases, the approach of the die-threads to the pipe is gradual, and their attack on the pipe to cut into it is gradual. This gradual attack is due to the angular relation between the sleeve and pipe, whether that angularity be introduced as by loose sleeves as in the third and fourth forms or by angular pipe mounting as in the first and second forms.

The gradual attack of the die-threads is an advantage because it avoids breaking them down before they have reached final deep cut anchorage into the pipe. However, when the die-threads begin to cut, their action is continuous during the several turns of the sleeve so that the sleeve is not limited to a half-turn as in cam devices which have been resorted to in the past. As the first die-thread cuts the pipe, the length of the first cut is short or a few degrees only of the thread circle, but as the sleeve continues to be turned, the thread cut increases in circumferential length and number of degrees until a maximum thread cut substantially half-way around the pipe exists or 180° or nearly so depending somewhat on the relation between the diameters of the die-thread opening and the pipe engaged thereby. The less the difference is between the radii of the die-thread opening and that of the pipe, the greater the circumferential reach of the die-threads around the pipe and hence the parts are fixed together in a positive manner.

These points and features are brought out in Figures 4 and 5 referred to in connection with this part of the description, and also holds true for the loose thread form of the invention, and similarly holds true for the smooth or threadless construction of coupler which is the fourth form of the invention. I lay claim to the several forms of construction as produced under their common principles shown throughout the drawings, and to other forms of construction coming within my principles.

While I have shown the die-threads in the pipe gripping opening of the sleeve of less pitch than the cooperating or engaged threads of the externally threaded neck and the internally threaded sleeve, I may prefer to adopt another degree of thread differential between the neck threads and the gripping threads. The invention serves many purposes and affords a suitable construction for a variety of uses.

What I claim is:

1. A pipe coupler comprising, a coupler member including an externally threaded neck provided with a smooth pipe opening, an anchorage sleeve internally threaded and screwed onto the neck, said sleeve being provided with a threaded aperture larger than and embracing a pipe received into the neck; and said pipe and anchorage sleeve having an angular relation existing therebetween by which the threaded aperture gradually approaches the pipe and cuts its way into the pipe as the sleeve is rotated, and by which continued rotation thereof cuts the threaded aperture deeper into said pipe.

2. A coupler comprising, a coupler neck externally screw-threaded, an anchorage sleeve screw mounted onto the neck, a threaded gripping edge carried with the sleeve, said neck being provided with an eccentrically positioned pipe opening for reception of a pipe, said pipe and sleeve having an angular relation therebetween by which the threaded edge first lightly engages the neck for a short thread cut and gradually continues into a longer thread cut.

3. A coupler comprising, a neck provided with an opening eccentric to its outer surface, said opening being parallel to the neck, said opening being restricted in size to provide a snug fit with a pipe, an anchorage sleeve including a gripping aperture, said sleeve and aperture loosely embracing the neck and eccentrically held pipe so that the sleeve stands at an angle to the pipe, and said sleeve adapted to be moved lengthwise on the neck to drag the gripping aperture on the pipe.

4. A coupler comprising; a threaded neck having an enlarged pipe opening eccentric to the neck threads to receive a pipe loosely thereinto so that the pipe may be tilted at an angle to the neck axis; a sleeve threaded toward one end and screwed onto the neck and embracing the pipe, a threaded gripping aperture formed in the other end of the sleeve and larger than the pipe which it embraces, and said sleeve adapted to be screw-tightened on the neck to bring the threaded aperture into gripping engagement with the pipe.

5. A coupler comprising; an externally threaded neck provided with a smooth pipe opening, the opening being restricted for a snug fit with a pipe placed therein, said opening being formed at an angle to the neck thread axis, and said opening being located eccentrically to the neck thread axis; a sleeve internally threaded at one end and screwed onto the neck threads, and a threaded gripping aperture carried at the other end of the sleeve and adapted to cut into the pipe when the sleeve is turned.

6. A coupler comprising; an externally threaded neck provided with a pipe opening, which opening is eccentric to the neck threads, and the axis of the opening is parallel to the axis of the neck threads and a pipe mounted straight into the coupler neck; an anchorage sleeve internally screw threaded toward one end, said threads being formed on a greater radius than that of the neck threads whereby the sleeve occupies a loose wobbly fit on the neck so the sleeve tilts at an angle to the axis of the neck threads; said loosely threaded sleeve having a threaded gripping aperture carried at the other end and embracing the pipe whereby rotation of the sleeve advances it on the neck, to gradually eliminate the tilt and angle, to bring the threaded aperture in gripping engagement with the pipe.

7. A coupler comprising a coupler member having a bore to receive a member to be secured therein, anchorage means upon the coupler member having longitudinal movement thereupon, the longitudinal movement of the anchorage means being at an angle to the axis of the member to be secured in the bore, a gripping edge upon the anchorage means to contact with and secure the member in the bore upon longitudinal movement of the anchorage means, and threads upon the gripping edge adapted to engage and cut into the member to be secured within the coupler.

8. A coupler comprising a coupler member having a bore to receive a member to be secured therein, screw threads upon the coupler member, anchorage means threadedly engaging the threads upon the coupler member and forced longitudinally of the coupler member thereby, the longitudinal movement of the anchorage means being at an angle to the axis of the member to be secured in the bore, a gripping edge upon the anchorage means to contact with and secure the member in the bore upon longitudinal movement of the anchorage means, and threads upon the gripping edge adapted to engage and cut into the member to be secured within the coupler.

9. A coupler comprising a coupler member having a bore to snugly receive a member to be secured therein, anchorage means upon the coupler member and having longitudinal movement thereupon, the bore being angular to the axis of longitudinal movement of the anchorage means upon the coupler member, a threaded gripping edge upon the anchorage means to contact with and secure the member in the bore upon longitudinal movement of the anchorage means, and the gripping edge being eccentrically positioned relatively to the bore and to the member to be secured at the point where the gripping edge engages the member.

In testimony whereof I affix my signature.

GEORGE C. THOMAS, Jr.